United States Patent [19]
Kanota et al.

[11] Patent Number: 5,122,912
[45] Date of Patent: Jun. 16, 1992

[54] SIGNAL PROCESSING APPARATUS SELECTING A SCRAMBLED SIGNAL HAVING A DESIRED DC COMPONENT FROM AMONG A PLURALITY OF SCRAMBLED SIGNAL OBTAINED BY SCRAMBLING AN INPUT-DATA SIGNAL WITH RESPECTIVE PSEUDO-RANDOM SIGNALS

[75] Inventors: Keiji Kanota, Kanagawa; Michio Nagai, Saitama, both of Japan

[73] Assignee: Sony Corporation, Tokyo, Japan

[21] Appl. No.: 353,815

[22] Filed: May 18, 1989

[30] Foreign Application Priority Data

May 24, 1988 [JP] Japan ................... 63-126606

[51] Int. Cl.$^5$ .................. G11B 5/09; H03M 5/00
[52] U.S. Cl. ...................... 360/46; 360/40; 341/58
[58] Field of Search ........ 360/40, 46; 375/18; 341/50, 58, 59; 371/47.1, 57.1, 57.2

[56] References Cited
U.S. PATENT DOCUMENTS 4,301,537  11/1981  Roos ........................ 375/1

FOREIGN PATENT DOCUMENTS 0104700  4/1984  European Pat. Off. .
2149560  6/1985  United Kingdom .

Primary Examiner—Aristotelis Psitos
Assistant Examiner—Won Tae C. Kim
Attorney, Agent, or Firm—Alvin Sinderbrand; William S. Frommer

[57] ABSTRACT

An apparatus for processing an input data signal has a generator providing a plurality of pseudo-random signals each of which scrambles the input data signal for providing a plurality of respective scrambled outputs, a detector by which a DC component, such as, a run-length or a digital sum value, is detected for each of the scrambled outputs, and a selector responsive to the detector for selecting one of the scrambled outputs, for example, having a minimum run-length or a digital sum value closest to zero. An identifying signal identifying the pseudo-random signal used in scrambling the selected scrambled output is then transmitted with the latter, for example, by recording on a magnetic tape. When the transmitted signal is received or reproduced, the identifying signal included with it is detected, and the received signal is descrambled with a pseudo-random signal corresponding to the detected identifying signal.

8 Claims, 10 Drawing Sheets

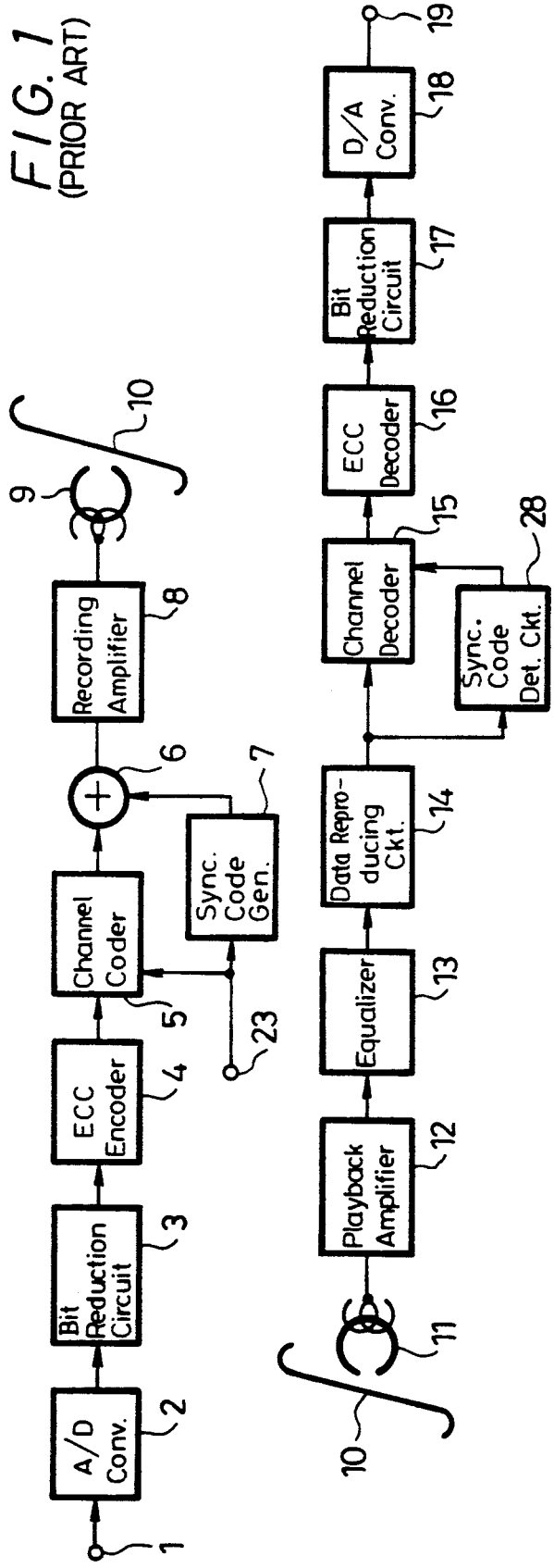
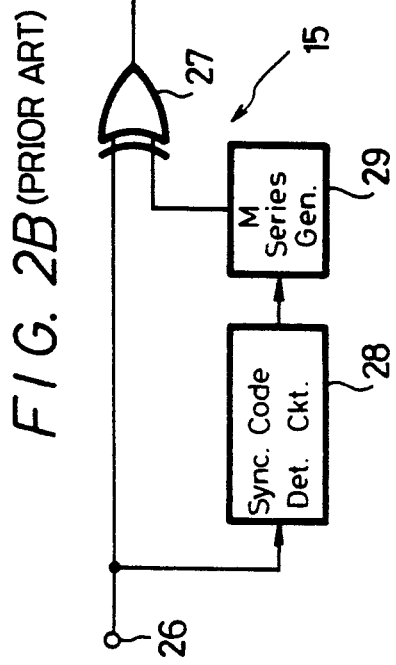
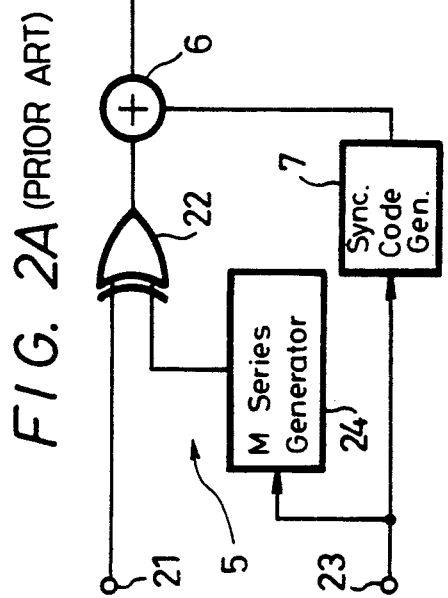
FIG. 1 (PRIOR ART)
FIG. 2A (PRIOR ART)
FIG. 2B (PRIOR ART)

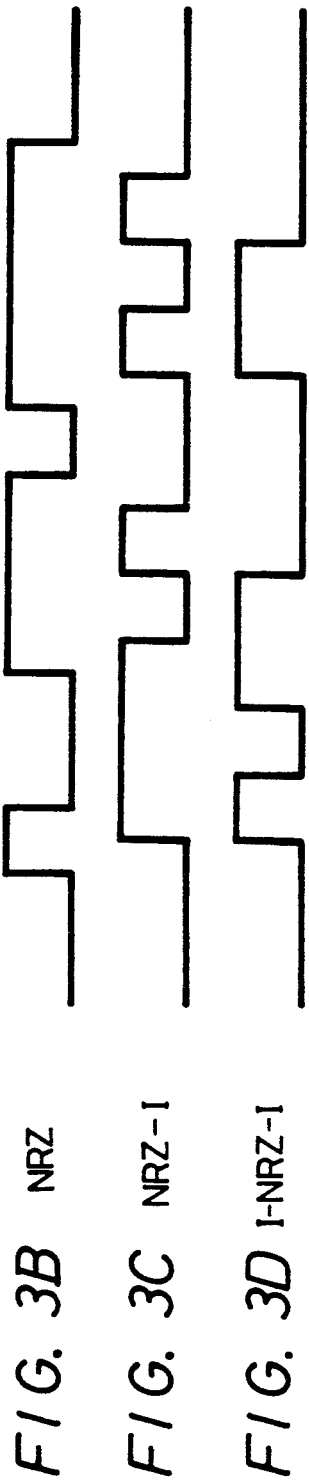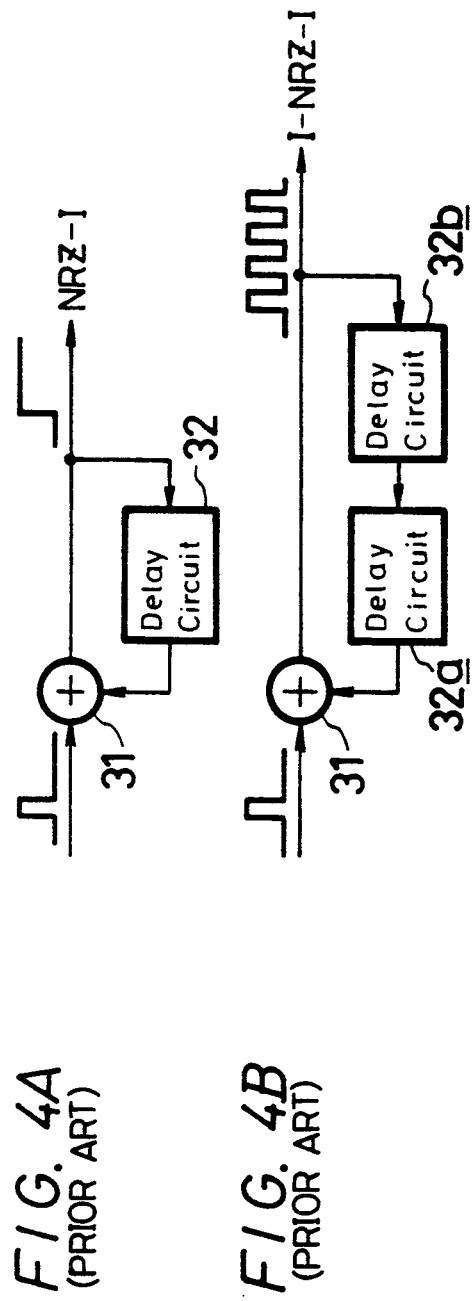
FIG. 3A Input Signal
FIG. 3B NRZ
FIG. 3C NRZ-I
FIG. 3D I-NRZ-I
FIG. 4A (PRIOR ART)
FIG. 4B (PRIOR ART)

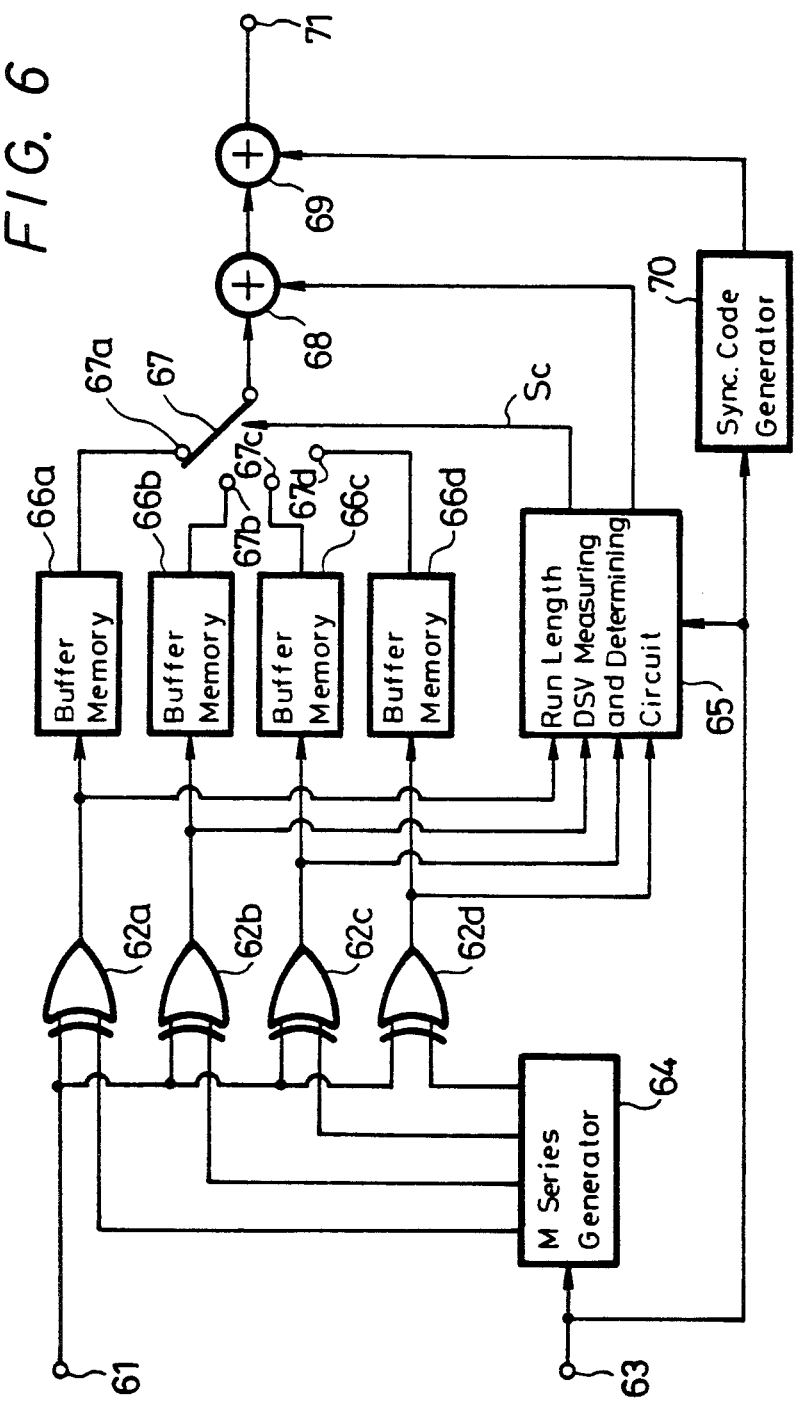

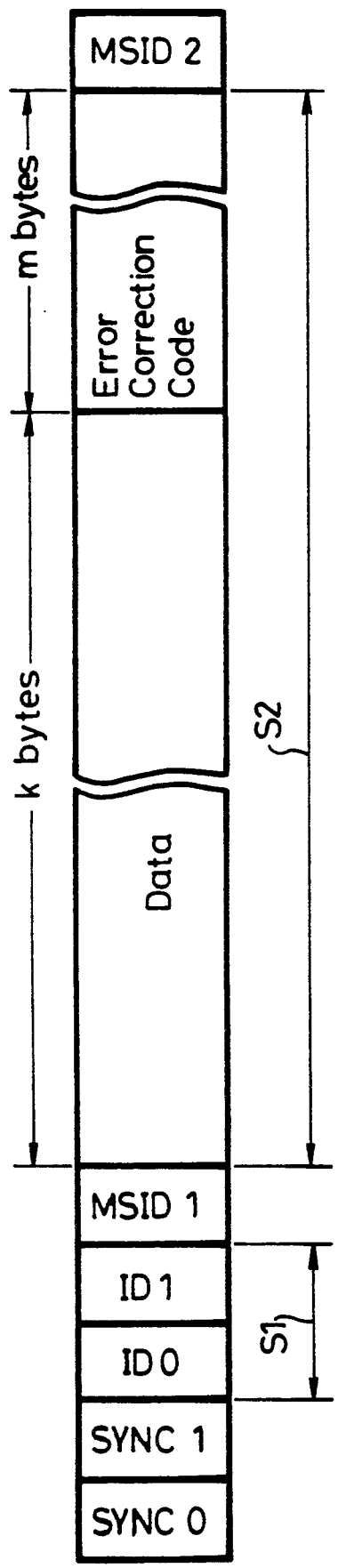
F I G. 12
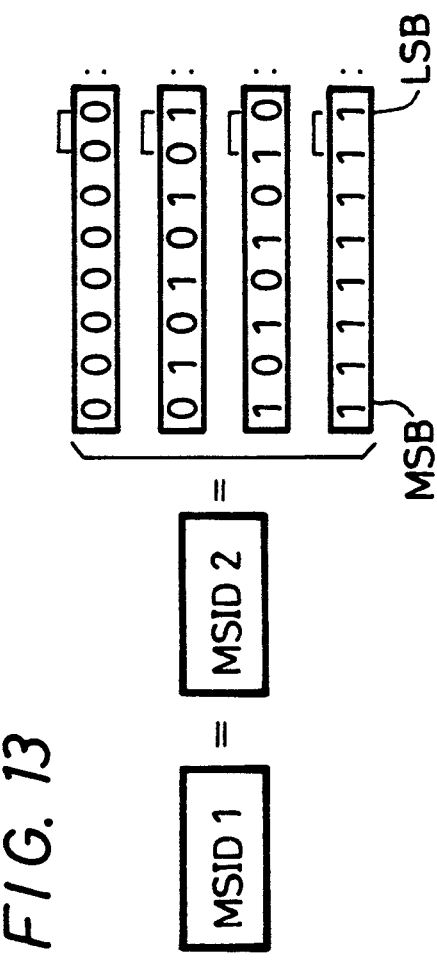
F I G. 13

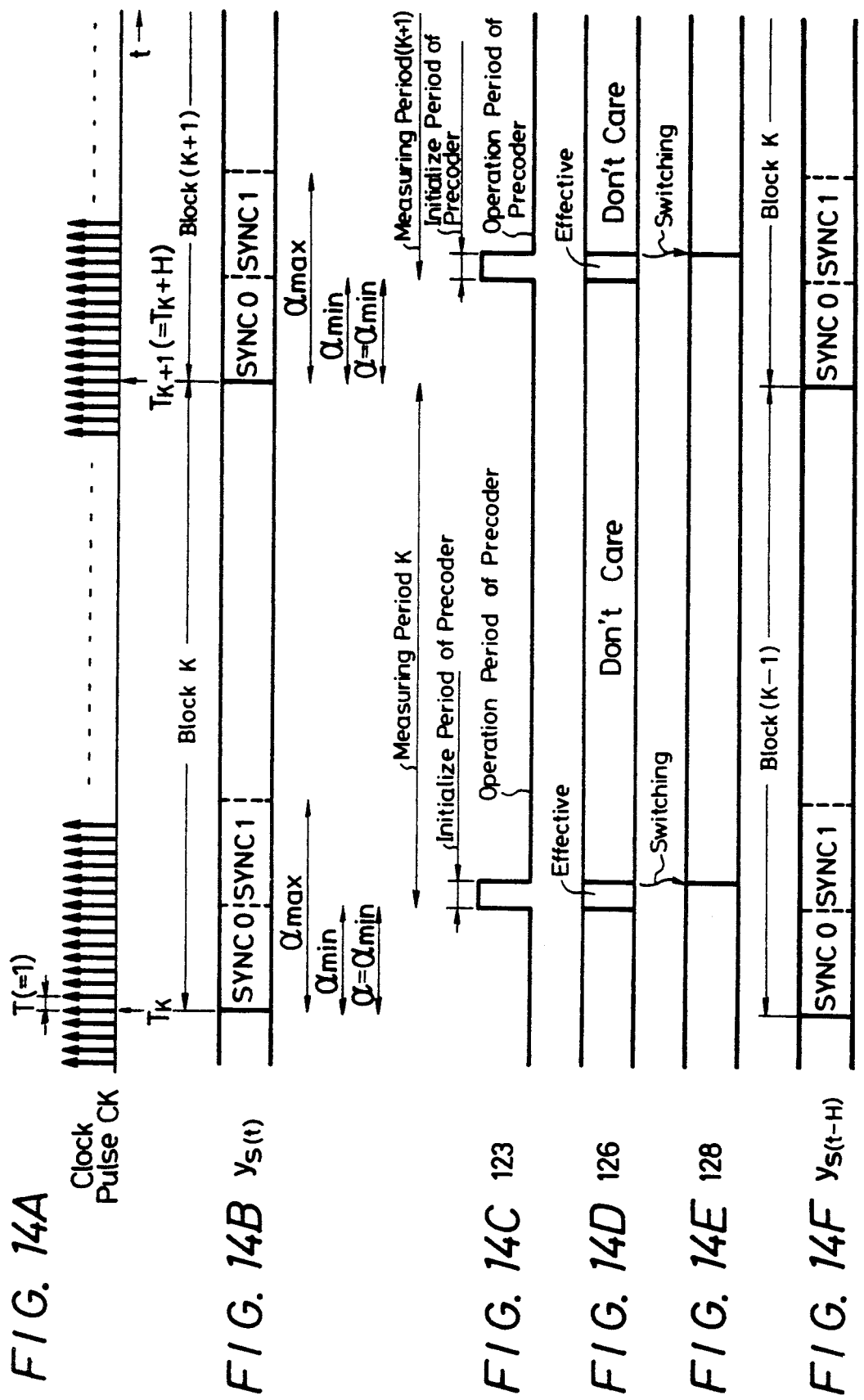

SIGNAL PROCESSING APPARATUS SELECTING A SCRAMBLED SIGNAL HAVING A DESIRED DC COMPONENT FROM AMONG A PLURALITY OF SCRAMBLED SIGNAL OBTAINED BY SCRAMBLING AN INPUT-DATA SIGNAL WITH RESPECTIVE PSEUDO-RANDOM SIGNALS

BACKGROUND OF THE INVENTION

1. Field of the Invention

The present invention relates to the application of selective scrambling to a channel coding circuit, for example, in a digital video tape recorder.

2. Description of the Prior Art

A digital video tape recorder of a type to which the present invention is applicable will be described with reference to FIG. 1 in which a video signal, for example, according to the NTSC system, is supplied to an input terminal 1. The NTSC video signal applied to the input terminal 1 is supplied to an analog-to-digital (A/D) converting circuit 2, in which it is converted to a digital data signal. The digital data signal is supplied to a bit reduction circuit 3, in which it is reduced in bit number and is then fed to an error correction code (ECC) encoder 4. The ECC encoder 4 adds a parity code for error correction and the like to the data signal. The data signal having the parity code added thereto is supplied to a channel coder 5, in which it is converted to a data series whose characteristic conforms to the characteristic of a tape head system of the digital video tape recorder. The data series is supplied to an adding circuit 6, in which it is added to a predetermined synchronizing (SYNC) code from a synchronizing code generating circuit 7 to provide a recording data signal. The recording data signal which includes the synchronizing code is supplied from the adding circuit 6 through a recording amplifier 8 to a recording head 9 and is thereby recorded on a magnetic tape 10

Upon playback, a signal reproduced from the magnetic tape 10 by a reproducing head 11 is supplied through a playback amplifier 12 to an equalizer 13, in which it is waveform-shaped in a predetermined manner. The thus waveform-shaped signal is supplied to a data reproducing circuit 14 which reproduces a data series therefrom. The reproduced data series is supplied to a channel decoder 15 which operates in a manner exactly opposite the operation of the channel coder 5 provided at the recording side. The decoded signal from the channel decoder 15 is supplied to an error correction code (ECC) decoder 16, in which it is error-corrected by the above-mentioned parity code. The error-corrected signal is reduced in bit number by a bit reduction circuit 17 and is then converted from digital to analog form by a digital-to-analog (D/A) converting circuit 18. Finally, the reproduced analog video signal is provided at an output terminal 19.

In the use of the digital video tape recorder of FIG. 1 for recording on a previously recorded tape, a video signal is generally rewritten by a so-called overwrite system. In such overwriting, if an already recorded signal contained a low frequency component, there is then the risk that a satisfactory erasing characteristic will not be achieved in the next overwrite because the low frequency component is recorded in a relatively deep layer of the tape or other magnetic record medium. Further, there is a substantial possibility that a low frequency component in the signal recorded in adjacent tracks will result in a cross-talk component upon playback.

Furthermore, when a rotary transformer is provided for transmitting signals to and from the head or heads of the digital video tape recorder, the low frequency band that can be transmitted by the rotary transformer is limited so that a low frequency component in the recorded signal causes distortion in the waveform of the reproduced signal.

Therefore, the digital video tape recorder according to the prior art includes the channel coder 5 and the channel decoder 15 in order to reduce the low frequency component. FIGS. 2A and 2B illustrate known circuit arrangements that can be used for the channel coder 5 and the channel decoder 15, respectively, in FIG. 1, and which utilize an M series signal as a pseudo-random signal.

In the channel coder 5 shown in FIG. 2A, the signal from the ECC encoder 4 (FIG. 1) is supplied through an input terminal 21 to a modulo (mod.)2-adder 22 which may be constituted by an exclusive-OR gate. A reset signal associated with a predetermined synchronizing block, and which is applied to a terminal 23, is supplied therefrom to an M series generator 24. The M series signal from the M series generator 24 is also supplied to the mod. 2-adder 22 which scrambles the M series signal for effecting the channel coding. The reset signal applied to the terminal 23 is also supplied to the synchronizing code generator 7 which provides the above-mentioned synchronizing code. The synchronizing code is supplied to the adding circuit 6, in which it is added to the data series from the mod. 2-adder 22, and the resulting added output is applied from an output terminal 25 to the recording amplifier 8 shown in FIG. 1.

In the channel decoder 15 shown in FIG. 2B, the data signal from the data reproducing circuit 14 (FIG. 1) is supplied through an input terminal 26 to a mod. 2-adder 27 which is also constituted by an exclusive-OR gate. The signal from the terminal 26 is also supplied to a synchronizing code detecting circuit 28 which detects the above-mentioned synchronizing code. The detected signal is supplied from circuit 28 to an M series generator 29 which provides an M series signal to the mod. 2-adder 27 which effects channel decoding, that is, decodes the signal scrambled by the M series signal in the channel coder 5. The resulting decoded signal is supplied through an output terminal 30 to the ECC decoder 16 (FIG. 1).

The low frequency component in the signal to be recorded is reduced by adding the M series signal to the pseudo-random signal in the modulo 2 adder 22 in FIG. 2A, whereby a recording data signal having a reduced low frequency component is generated. Upon playback the M series signal is added in the mod.2-adder 27 to the same pseudo-random signal as in the recording mode resulting in the original data signal being decoded.

If the M series signal is added to the pseudo-random signal in a modulo 2 adder for effecting the channel coding and the channel decoding as described above, in the absence of any other data signal processing, when a certain relationship is established between the pattern of the recording signal and that of the M series signal, there is the possibility that such relationship will give rise to the occurrence of a low frequency component. The occurrence of the low frequency component is inevitable from a probability standpoint, and it is impossible to escape such inevitability. The occurrence of such low frequency component causes deterioration of the overwrite characteristic, the cross-talk characteristic, the waveform characteristic and the like, as described above.

Further, in a digital magnetic recording and reproducing apparatus, such as, the above described digital video tape recorder, if the digital data series (represented in the binary form of "1" or "0") is directly recorded, the following problems arise:

1. The maximal frequency of a recorded signal is increased to such extent that the recorded signal cannot be read.

2. Direct current and low frequency components frequently appear in the recorded signal so that, when a digital signal is recorded and reproduced by the head system utilizing a rotary transformer, distortion occurs in the reproduced signal. As a result, it is frequently observed that the reproduced information deviates considerably from the recorded information.

3. When digital data is recorded, a data series is generally recorded according to the so-called self-clock system together with a clock component. If many digital "1"" or "0"' appear in succession or contiguously, the error rate in extracting the clock component at the playback side is increased.

In order to solve the above-mentioned problems, it is known to arrange a digital magnetic recording and reproducing apparatus so that, upon recording, a digital input signal is converted to a recording signal having a predetermined frequency characteristic by a channel coding circuit, and this recording signal is recorded on a magnetic record medium by a recording head. Upon playback, a signal reproduced from the magnetic record medium by a playback head is supplied to, and is reproduced by, a decoder whose converting characteristic is opposite to that of the channel coding circuit. Three channel coding systems are known that are each based on a partial response (PR) system which makes effective use of inter-symbol interference in the digital recording. These three channel coding systems will be explained below:

A. Nonreturn to zero-inverted (NRZ-I) system

In the NRZ-I system, an NRZ signal (FIG. 3B), which represents an input signal shown in FIG. 3A in the form of a binary code, is converted to an NRZ-I recording signal shown in FIG. 3C. The NRZ-I system utilizes an encoder to convert the input signal to the recording signal just before the transmission line, and this encoder is what might be called a precoder. The NRZ-I system precoder is called a PR (1, −1) encoder because it effects the coding, that is, the conversion, just opposite to the conversion of a PR (1, −-1) transmission line based on the partial response system. FIG. 4A shows an example of a PR (1, −1) encoder that comprises a mod. 2 adder 31 and a one-bit delay circuit 32.

The NRZ-I system has the disadvantage that, when the signal is not inverted, a direct current component frequently appears in the recording signal. Recently, the interleaved NRZ-I (I-NRZ-I) system has been employed in order to remove that disadvantage of the NRZ-I system.

B. Interleaved NRZ-I (i-NRZ-I) system

According to the I-NRZ-I system, an NRZ signal shown in FIG. 3B is converted to an I-NRZ-I recording signal shown in FIG. 3D by means of an I-NRZ-I system precoder which performs a conversion reverse to that in a PR (1, 0, −1) transmission line based on the class IV partial response. Such I-NRZ-I system precoder is called a PR (1, 0, −-1) encoder or a partial response class IV encoder. FIG. 4B shows an example of a PR (1, 0, −1) encoder that comprises a mod. 2 adder 31 and two one-bit delay circuits 32a and 32b.

An identifying signal, which results from recording and reproducing the I-NRZ-I recording signal, has frequency characteristics similar to those of the magnetic recording and reproducing systems so that it contains less high frequency components and does not contain a direct current component. In addition, the identifying signal cannot be affected by the cross-talk component caused by the increased wavelength of the recording signal and cannot be affected by the rotary transformer.

C. Scrambled I-NRZ-I (S-I-NRZ-I) system

Although the identifying signal reproduced according to the I-NRZ-I system does not contain a direct current component, the recording signal (see FIG. 3D) does contain a direct current component. In order to reduce the direct current component of the recording signal according to the I-NRZ-I system, the S-I-NRZ-I system has been proposed. In accordance with the S-I-NRZ-I system, the M series signal (represented in the form of a binary random number) is added to the input signal in a mod. 2 adder, or the input signal is scrambled by the M series signal, so as to make possible reducing of the direct current component.

Referring now to FIG. 5, it will be seen that, in a prior-art digital video tape recorder utilizing the S-I-NRZ-I system channel coding circuit, a video signal is applied to an input terminal 43 and is supplied from the latter through a scramble circuit 44 to a PR (1, 0, −1) encoder or precoder 45. The scramble circuit 44 and the PR (1, 0, −1) encoder 45 constitute a channel coding circuit. A recording head 46A with an associated rotary transformer, a magnetic tape 46B and a reproducing head 46C with an associated rotary transformer constitute a PR (1, -1) transmission line 47. A PR (1, 1) decoder 48 is adapted to equalize input data [00100 . . .] to provide data [001100 . . .]. The PR (1, −1) transmission line 47 and the PR (1, 1) decoder 48 together constitute a PR (1, 0, −1) transmission line 49. A synchronizing pulse detecting circuit 50 is adapted to detect a synchronizing pulse SYP in the output of a discriminator 48A which is operatively interposed between the PR (1, 1) decoder 48 and the synchronizing pulse detecting circuit 50. The digital video tape recorder of FIG. 5 further has a descramble circuit 51 and an output terminal 52.

When a recording signal [00100 . . .] is supplied from the PR (1, 0, −1) encoder 45 to the recording head 46A, such recording signal is converted, in the PR (1, −1) transmission line 47 including the recording head 46A, the tape 46B and the reproducing head 46C, to a reproduced signal [001-100 . . .]. This reproduced signal [001-100 . . .] is supplied to the PR (1, 1) decoder 48 and converted by the latter to an identifying signal [0010-100 . . .]. The output from the PR (1, 1) decoder 48 is supplied to the discriminator 48A, in which it is processed so that [−1] is changed to [+1]. The resulting identifying signal is identical with the scramble signal [0010100 . . .] that is used when the PR (1, 0, −1) encoder 45 generates the recording signal [00100 . . . ]. Therefore, it is to be understood that a conversion which is the reverse of that effected by the PR (1, 0, −1) encoder 45 is carried out in the PR (1, 0, −1) transmission line 49.

When a certain M series pseudo-random signal $M_0$ is added to the input signal in a mod. 2 adder in the scramble circuit 44, the same pseudo-random signal $M_0$ is added in a mod. 2 adder in the descramble circuit 51 to the identifying signal resulting when the output of the PR (1, 1) decoder 48 is processed in discriminator 48A such that [−1] is changed to [+1]. In such modulo 2 addition, the addition of the same number results in [000 . . .] so that the pseudo-random signal $M_0$ is removed to provide the same data at the terminal 52 as the input signal.

Therefore, with the channel coding circuit of the S-I-NRZ-I system, if the input signal has a particular pattern, the direct current component or the low frequency component of the recording signal derived from the PR (1, 0, −1) encoder 45 cannot be reduced by the modulo 2 adding of the pseudo-random signal $M_0$ to the input signal.

OBJECTS AND SUMMARY OF THE INVENTION

Accordingly, it is an object of the present invention to provide an improved selective scramble circuit which can avoid the foregoing problems encountered with the prior art.

More specifically, it is an object of the present invention to provide a selective scramble circuit which can carry out the channel coding satisfactorily.

Another object of the present invention is to provide a selective scramble circuit, as aforesaid, which can efficiently suppress increasing of data redundancy.

Still another object of the present invention is to provide a selective scramble circuit, as aforesaid, which can reduce a direct current component in a recording signal regardless of variations in the input signal pattern.

Still another object of the present invention is to provide a selective scramble circuit, as aforesaid, which can prevent conversion error from being mixed into a resultant recording signal.

A still further object of the present invention is to provide a selective scramble circuit which is suitable for application to a channel coding circuit of a digital video tape recorder.

According to an aspect of the present invention, an apparatus for processing a data signal comprises: generator means for generating a plurality of pseudo-random signals; scramble means for scrambling an input signal by a plurality of the pseudo-random signals and thereby providing a plurality of respective scrambled outputs; detector means for detecting variation of a DC component for each of the scrambled outputs of the scramble means; selector means for selecting one of the scrambled outputs under the control of the detector means, for example, the scrambled output having a digital sum value closest to zero; means for adding to the output of the selector means an information or identifying signal corresponding to the pseudo-random signal used in scrambling the input signal for providing such output of the selector means; and means for transmitting the output of the selector means with the information or identifying signal.

The above, and other objects, features and advantages of the present invention, will be apparent from the following detailed description of preferred embodiments of the invention when read in conjunction with the accompanying drawings, wherein the same reference numerals are used to identify the same or similar elements in the several views.

BRIEF DESCRIPTION OF THE DRAWINGS

FIG. 1 is a block diagram showing an arrangement of a prior-art digital video tape recorder;

FIG. 2A is a schematic block diagram showing an example of a known channel coder used in the digital video tape recorder of FIG. 1;

FIG. 2B is a schematic block diagram showing an example of a known channel decoder used in the digital video tape recorder of FIG. 1;

FIGS. 3A to 3C are schematic diagrams to which reference is made in explaining channel coding of an input signal;

FIG. 4A is a schematic block diagram showing a known partial response IV (1, −1) encoder;

FIG. 4B is a schematic block diagram showing a known partial response class IV (1, 0, −1) encoder;

FIG. 6 is a block diagram showing an M scramble circuit according to an embodiment of the present invention;

FIG. 7 is a diagrammatic view showing a data format and to which reference will be made in explaining the present invention;

FIG. 12 is a diagram showing a data format of the digital data signal used in accordance with the present invention, and which shows the arrangement of one synchronizing block;

FIG. 13 is a diagram showing a data arrangement of an M series identifying code that is used in accordance with the present invention; and FIGS. 14A to 14F are timing charts to which reference will be made in explaining the operation of a digital video tape recorder according to the present invention.

DETAILED DESCRIPTION OF THE PREFERRED EMBODIMENTS

Figure 5:
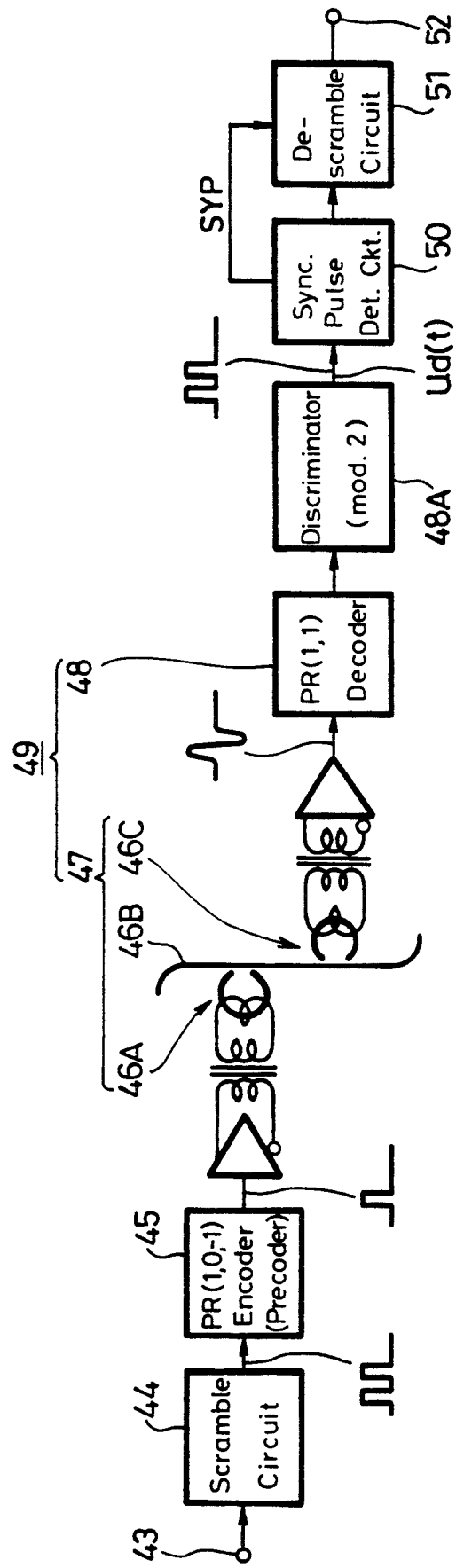
FIG. 5 is a schematic block diagram of a main portion of a digital video tape recorder according to the prior art.

Referring to the drawings in detail, and initially to FIG. 6, it will be seen that, in a selective M scramble circuit according to an embodiment of this invention that may be advantageously employed in the digital video tape recorder of FIG. 1, an input data signal is supplied through an input terminal 61 to mod. 2 adders 62a, 62b, 62c and 62d. Each of the mod. 2 adders 62a–62d may be constituted by an exclusive-OR gate as shown. A reset signal associated with a predetermined synchronizing block of the input signal is supplied through a terminal 63 to an M series generator 64. The M series generator 64 is provided with four output terminals, from which there are derived four M series signals of different phases. The four kinds of M series signals are supplied to the adders 62a-62d, respectively.

The output signals from the adders 62a-62d, that is, the input data signal scrambled by the respective M series signals, are supplied to a circuit 65 which measures run lengths and digital sum values (DSV) corresponding to changes of the direct current components of the respective signals. The circuit 65 is reset in response to the reset signal of each synchronizing block and identifies the output signal from the adders 62a-62d which has the shortest maximum run length and/or the output signal which has the smallest maximum digital sum value in the interval from one synchronizing block until the next synchronizing block. The run length is determined prior to the digital sum value.

The signals from the adders 62a-62d are supplied to respective buffer memories 66a-66d, each of which has a recording or storing capacity of one synchronizing block, and are then output therefrom in the first-in first-out (FIFO) fashion. The output signals from the buffer memories 66a-66d are fed to respective fixed contacts 67a-67d of a switch 67 which is controlled by a switch control signal $S_c$ from the circuit 65.

More particularly, the control signal $S_c$ causes the switch 67 to select the output signal from one of the buffer memories 66a-66d, and hence from the respective one of the adders 62a-62d, which has been determined by the circuit 65 to provide the M scramble signals with the shortest maximum run length and/or the smallest maximum digital sum value. The M scramble signal thus selected is supplied to a data adding circuit 68, in which it is added to a data code identifying or corresponding to the M series signal used for providing the selected M scramble signal.

The signal from the data adding circuit 68 is supplied to a synchronizing code adding circuit 69 and the reset signal from the terminal 63 is also applied to a synchronizing code generating circuit 70 which supplies a synchronizing code to the adding circuit 69, whereupon, the output signal from the latter is fed to an output terminal 71.

With the above-described selective M scramble circuit, good channel coding is effected by selecting the best one from among a plurality of M scramble signals. Further, by adding data identifying or corresponding to the M series signal used in the coding, it is possible to considerably reduce data redundancy.

The data format of the recording data signal developed at the output terminal 71 is represented in FIG. 7, where it will be seen that one synchronizing block is formed of a synchronizing code SYNC, a data code identifying or corresponding to the M series signal used in the coding and scrambled input data in this order. The data code can be expressed by, for example, two bits such as a=(0, 0), b=(0, 1), c=(1, 0) and d=(1, 1) in the illustrated case where four kinds of M series signals are provided. The increase of data redundancy is very small as a result.

When the circuit shown in FIG. 6 is applied to the digital video tape recorder described above with reference to FIG. 1, the output signal of the ECC encoder 4 is supplied to the input terminal 61, and the signal from the output terminal 71 is supplied to the recording amplifier 8, whereby, recording can be effected similarly to the prior art.

Figure 8:
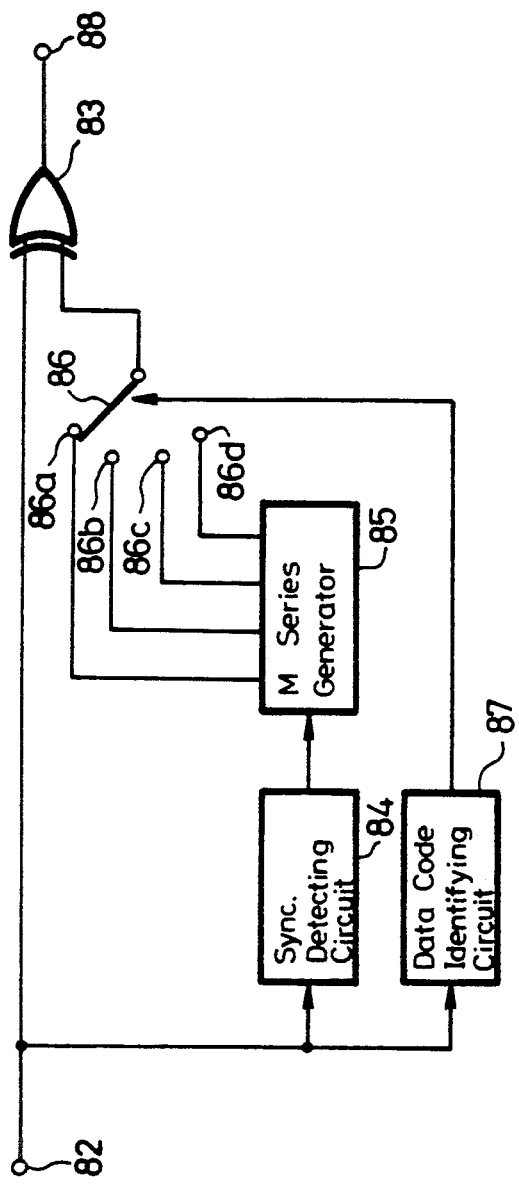
FIG. 8 is a block diagram of a channel decoder according to an embodiment of the present invention.

Referring now to FIG. 8, it will be seen that, in a decoder according to an embodiment of this invention for use in the playback mode of the digital video tape recorder of FIG. 1, a signal applied to an input terminal 82 is supplied to a mod. 2 adder 83 again constituted by an exclusive-OR gate. The signal from the input terminal 82 is also supplied to a synchronizing code detecting circuit 84 which detects the above-mentioned synchronizing code. The detected signal is supplied from circuit 84 to an M series generator 85 that is the same as the M series generator 64 shown in FIG. 6. Four kinds of M series signals that differ in place from each other are supplied from the generator 85 to respective fixed contacts 86a, 86b, 86c and 86d of a switch 86. The signal from the input terminal 82 is also supplied to a data code identifying circuit 87 which identifies the above-mentioned data code corresponding to the kind of M series signal used for the coding. By this identifying code, the switch 86 is controlled so as to select from the generator 85 the M series signal which is the same as that used in the recording mode.

The M series signal selectively derived from the switch 86 is supplied to the mod. 2 adder 83, and the signal from the adder 83 is fed to an output terminal 88. In this way, the data signal can be decoded. When the decoder described above with reference to FIG. 8 is applied to the digital video tape recorder of FIG. 1, the output of the data reproducing circuit 14 in FIG. 1 is supplied to the input terminal 82, and the signal from the output terminal 88 is supplied to the ECC decoder 16 in FIG. 1.

In the circuits of FIG. 6 and 8, the M series generators 64 and 85 are not limited to those which provide the M series signal with different phases but they may be M series generators of the type providing M series signals having different recurrent cycles.

With the circuits of FIGS. 6 and 8 included in the digital video tape recorder of FIG. 1, upon playback, it becomes possible to reproduce a clock signal with ease.

According to the present invention, as set forth above, good channel coding can be effected by selecting the best one from among the plurality of M scramble signals. Further, the increase of data redundancy is suppressed considerably by adding to the input or information signal data identifying the M series signal used in the coding.

Another embodiment of the present invention to which the class IV partial response system can be applied will now be described with reference to FIGS. 9-11 in which parts corresponding to those described with reference to FIG. 5 are identified by the same reference numerals and will not be again described in detail. In this embodiment, the present invention is particularly applied to the channel coding circuit of the digital video tape recorder.

Figure 9:
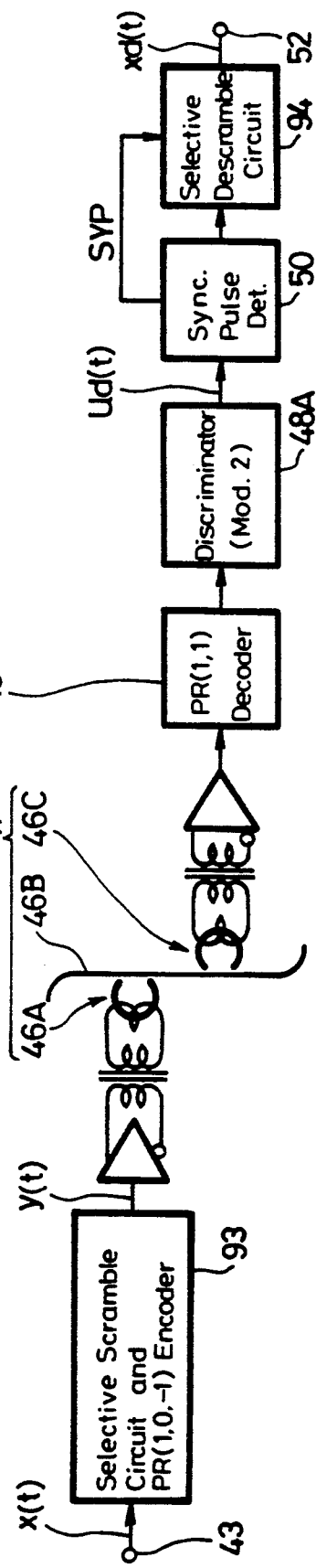
FIG. 9 is a block diagram of a digital video tape recorder according to another embodiment of the present invention.

It will be seen in FIG. 9 that an input terminal 43 receives a digital input signal x(t), in which t is the time, and this digital input signal x(t) has been processed to have an error correction code, for example, a cyclic redundancy check (CRCC) code and a parity code.

A selective scramble circuit 93 according to the present invention receives the digital input signal x(t) and includes a pseudo-random signal adding circuit and a plurality of PR (1, 0, −1) encoders or precoders used in the channel coding. By this selective scramble circuit 93, the digital input signal x(t) is converted to a recording signal y(t) having a reduced high frequency component and a reduced direct current component. The recording signal y(t) is processed by a PR (1, −1) transmission line 47 formed of the recording head 46A with its associated rotary transformer, the magnetic tape 46B and the reproducing head 46C with its associated rotary transformer to provide a reproduced signal. The reproduced signal is fed to the PR (1, 1) decoder 48, and the output signal from the PR (1, 1) decoder 48 is processed by the discriminator 48A so that [−1] is converted to [+1]. The identifying signal Ud(t) derived from the discriminator 48A is supplied to the synchronizing pulse detecting circuit 50 which separates the synchronizing pulse SYP from the identifying signal Ud(t). A selective descramble circuit 94 is connected to the synchronizing pulse detecting circuit 50 and receives therefrom the synchronizing pulse SYP and the identifying signal Ud(t). The selective descramble circuit 94 is made to correspond to the selective scramble circuit 93 so as to remove the pseudo-random signal from the identifying signal Ud(t), and to supply the resulting output signal xd(t) to the output terminal 52.

Figure 10B:
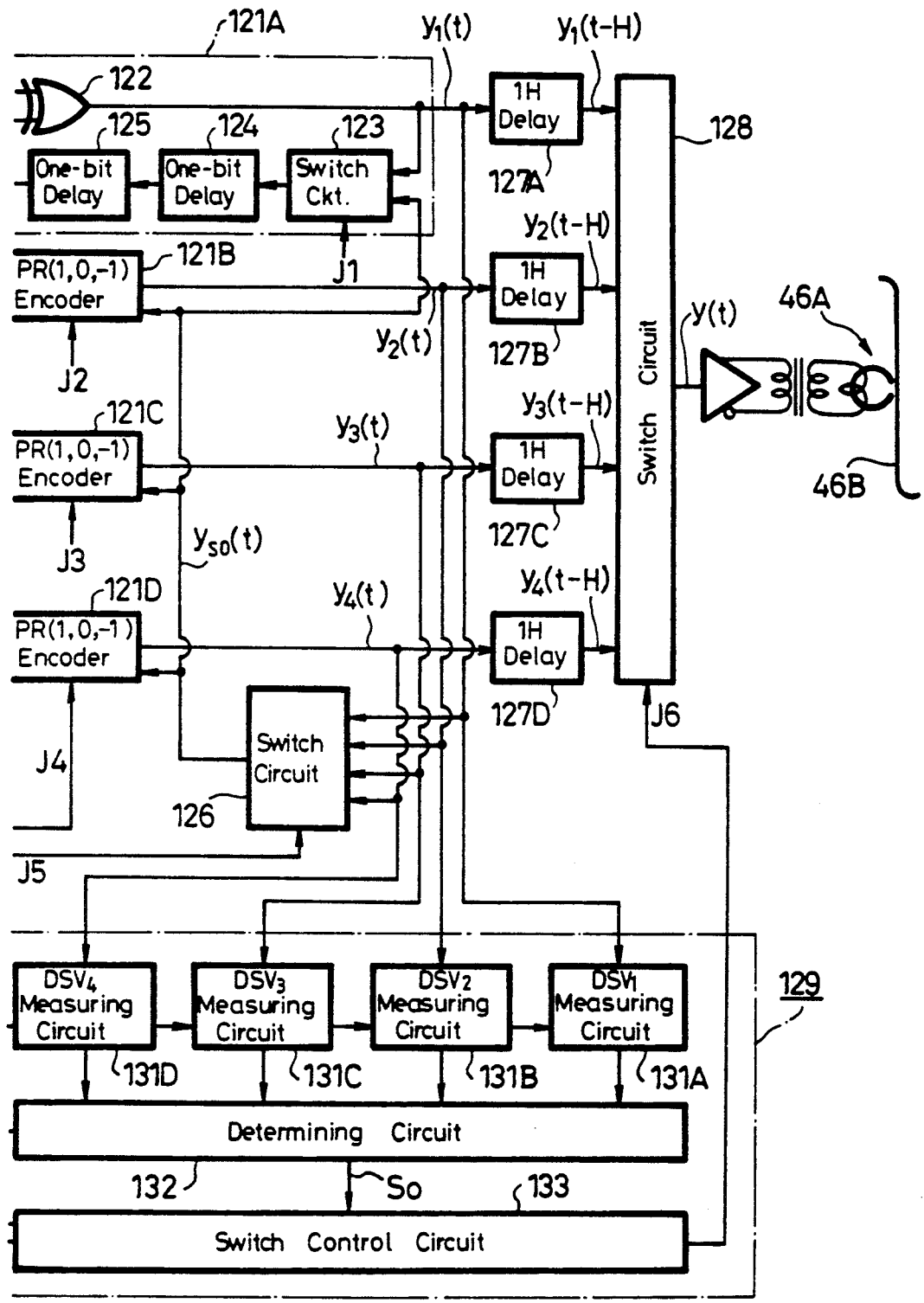
FIG. 10 (formed of FIGS. 10A and 10B together) is a block diagram showing a selective scramble circuit included in the digital video-tape recorder of FIG. 9.
Figure 10A:
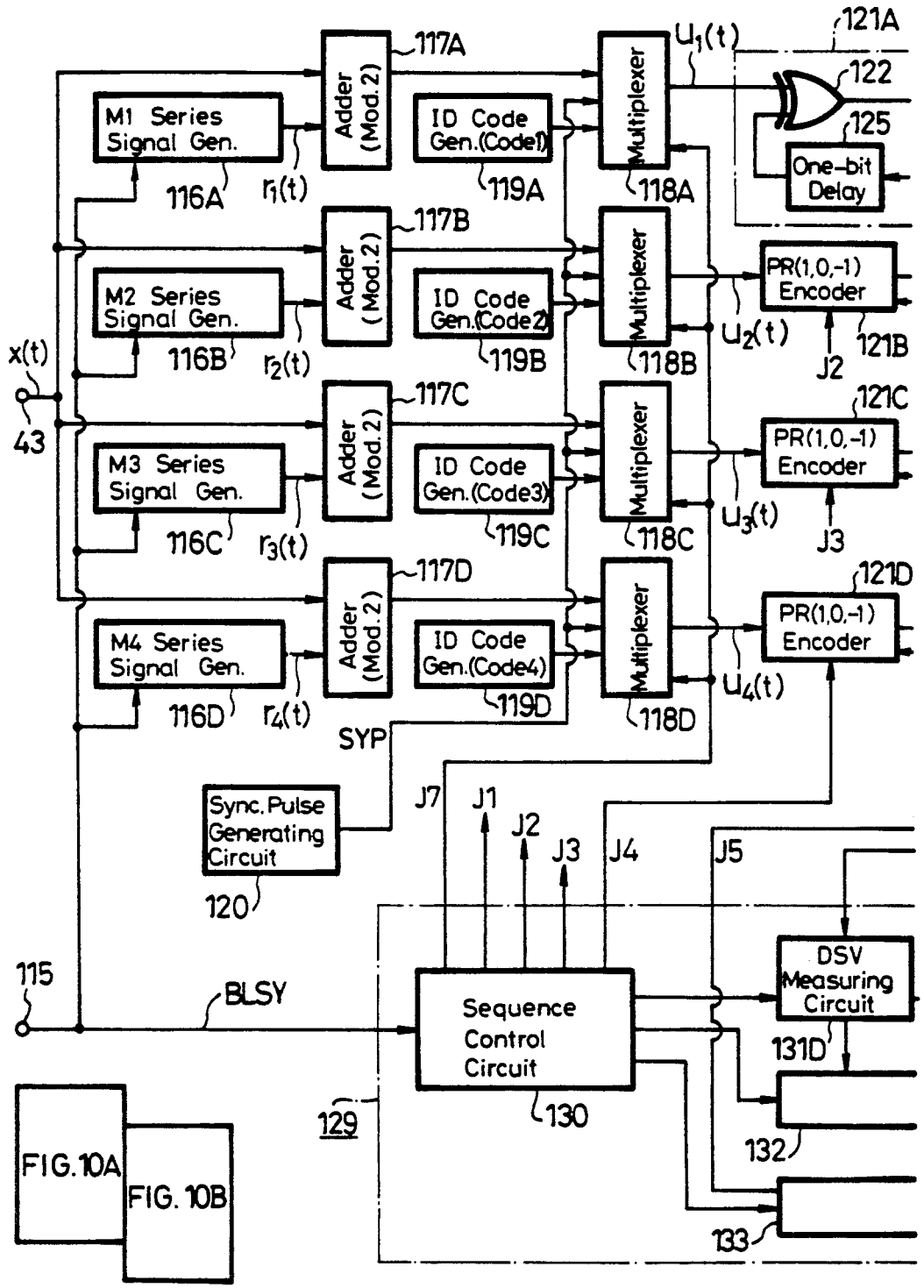

The selective scramble circuit 93 will now be described more fully with reference to FIG. 10 which is formed of FIGS. 10A and 10B to permit the use of a suitably large scale, and in which a block synchronizing pulse BLSY of cycle H is supplied to an input terminal 115 from the external circuit. M series generating circuits 116A, 116B, 116C and 116D are provided to generate respective M series signals $M_1$, $M_2$, $M_3$ and $M_4$ which are different from one another so as to constitute pseudo-random signals. These M series signals $M_1$-$M_4$ are supplied to mod. 2 adders 117A-117D, adapted to perform the mod. 2 addition thereto of the input data signal x(t), and which are each constituted by, for example, an exclusive-OR gate. Three-input multiplexers 118A-118D receive the outputs of the mod. 2 adders 117A-117d, respectively, and identifying codes from identifying code generating circuits 119A-119D, respectively, which correspond to the M1-M4 series signals The identifying codes generated by the identifying code generating circuits 119A, 119B, 119C and 119D are referred to as code 1, code 2, code 3 and code 4, respectively. Further, a synchronizing pulse generating circuit 120 is provided to generate the synchronizing pulse SYP which is also supplied to each of the multiplexers 118A-118D.

The block synchronizing pulse BLSY is supplied to the M series generating circuits 116A-116D so that the latter are initialized at every cycle H. Then, signals r1(t)-r4(t) of the $M_1$-$M_4$ series, respectively, generated by the M series generating circuits 116A-116D are added in mod. 2 to the input signal x(t) by means of the mod. 2 adders 117A-117D. The output signals of the mod. 2 adders 117A-117D, the identifying codes from the identifying code generating circuits 119A-119D and the synchronizing pulse SYP generated by the synchronizing pulse generating circuit 120 are supplied to the multiplexers 118A-118D, respectively, in which they are combined in a time-division-manner to generate signals u1(t)-u4(t), respectively.

Each of the time series or multiplexed signals u1(t)-u4(t) is a cyclic signal of cycle H, and the signal format of one synchronizing block of cycle H is represented in FIG. 12. Such synchronizing block is shown to comprise synchronizing pulses SYNC0 and SYNC1 each of one byte, data identifying codes (program number, etc.) ID0 and ID1 each of one byte and an M series identifying code MSID1 of one byte. The identifying code MSID1 is followed by audio or video data DATA of k bytes, an error correction code, for example, a parity code, of m bytes, and an M series identifying code MSID2 of the same data format as the identifying code MSID1. The area S1 of the block formed of the data identifying codes ID0 and ID1 and the area S2 formed of the data and the error correction code are scrambled by the M series signals.

The M series identifying codes which were referred to above as the codes 1, 2, 3 and 4, and which selectively constitute the M series identifying codes MSID1 and MSID2, are represented as [00000000], [01010101], [10101010] and [11111111], respectively, as shown on FIG. 13.

With such arrangement, data of two bits ([00], [01], [10] or [11]) is shown to be repeatedly written four times for each of the codes 1, 2, 3 and 4, respectively, so that even when an error occurs in the transmission system, the identifying code of the M series being used can be positively read. Further, in the embodiment being here described, the M series identifying code MSID2 is of the same format as the code MSID1 and is located distant from each M series identifying code MSID1 by (k +m) bytes. Thus, regardless of the occurrence of burst error, the identifying code can be accurately read on the basis of either one of the M series identifying codes MSID1 and MSID2.

Referring back to FIG. 10, it will be seen that the output signals u1(t)-u4(t) from the multiplexers 118A-118D are respectively supplied to partial response (PR) class IV (1, 0, −1) encoders 121A-121D acting as precoders, and in which the signals u1(t)-u4(t) are respectively converted to signals y1(t)-y4(t). The PR (1, 0, −1) encoders 121A-121D are all similarly constructed and, by way of example, the PR (1, 0, −1) encoder 121A will be described in detail.

The PR (1, 0, −1) encoder 121A is shown to be comprised of an exclusive-OR gate 122 that carries out the mod. 2 addition, a two-input switch circuit 123 and two one-bit delay circuits 124 and 125. The signal y1(t) is supplied from the output of the exclusive-OR gate 122 to a first input terminal of the switch circuit 123 and the switch circuit 123 responds to the level of a control signal J1 from a control circuit 129 to selectively supply one of its two input signals through the one-bit delay circuits 124 and 125, in succession, to an input of the exclusive-OR gate 122.

A four-input switch circuit 126 is shown to receive the signals y1(t)-y4(t) at its four input terminals, respectively. The switch circuit 126 responds to a code of a control signal J5 from the control circuit 129 to select one of the signals y1(t)-y4(t) and to supply such selected signal ys0(t) to the other or second input terminal of the switch circuit 123 in each of the PR (1, 0, −1) encoders 121A-121D. The signals y1(t)-y4(t) from encoders 121A-121D are converted to signals y1(t-H)-y4(t-H), respectively, by delay circuits 127A-127D each having a delay time of one horizontal period (1H), and are then respectively fed to four input terminals of a switch circuit 128. The switch circuit 128 responds to a code of a control signal J6 also derived from the control circuit 129 to select one of the signals y1(t-H)-y4(t-H) as the recording signal y(t). The recording signal y(t) is recorded on the magnetic tape 46B by means of the 10 recording head 46A.

The control circuit 129 is shown in FIG. 10 to include a sequence control circuit 130 which responds to the block synchronizing pulse BLSY from the terminal 115 to generate the control signals J1-J4 supplied to the switch circuits 123 of the encoders 121A-121D, respectively, and also to generate timing signals used to control the operation of additional hereinafter described circuits included in the control circuit 129. A control signal J7 is also generated by the sequence control circuit 130 and is employed to simultaneously switch the multiplexers 118A-118D.

The control circuit 129 is further shown to include digital sum value (DSV) measuring circuits 131A-131D. A digital sum value (DSV) of digital data series yi(t) from, for example, time $t_1$ to time $t_2$, is defined by the following equation:

$$DSV = \sum_{t=t_1}^{t_2} ai(t) \qquad (1)$$

where yi(t)=1 results in ai(t)=1, and yi(t)=0 results in ai(t)=0, and further assuming that the digital data series yi(t) is generated bit by bit in synchronism with a clock pulse CK whose unit time is T. (FIG. 14A).

In the present embodiment, when the digital sum value is converged to zero, a direct current component of the digital data series yi(t) becomes zero. The signals y1(t)-y4(t) are supplied to the DSV measuring circuits 131A-131D, respectively, which measure the digital sum values $DSV_1$-$DSV_4$, respectively, during a predetermined period corresponding to a block K (FIG. 14C). The resultant digital sum values $DSV_1$-$DSV_4$ are supplied to a determining circuit 132 within the control circuit 129. The determining circuit 132 determines which of the digital sum values $DSV_1$-$DSV_4$ generated by the measuring circuits 131A-131D, respectively, is closest to zero, and supplies a corresponding series number s0 identifying the respective one of the M series signals r1(t)-r4(t) to a switch control circuit 133. If the digital sum values of the signals y1(t)-y4(t) are measured for one synchronizing block K in which time t ranges from $T_K$ (=0) to $T_{K+1}$ (=$T_K$+H), in the next time t from $T_{K+1}$ to $T_{K+2}$, the one of the signals y1(t)-y4(t) of the block K whose digital sum value is closest to zero is selected by the switch circuit 128 under the control of the switch control circuit 133 to provide the recording signal y(t).

The operation of the embodiment of the invention illustrated in FIG. 10 will now be described with reference to FIGS. 14A-14F.

The output signal Us(t) of each of the multiplexers 118A-118D is expressed, when the respective M series identifying code and the synchronizing pulse SYP are removed therefrom, by the following equation:

$$US(t) = x(t) + rs(t) \pmod{2}; s=1\sim4 \qquad (2)$$

output signal ys(t) of each of the PR (1, 0, −1) encoders 121A-121D is expressed as follows:

$$ys(t) = ys(t-2) + US(t) \pmod{2} \qquad (3)$$

If it is assumed that data becomes effective from time t=0, that ys(−2)=ys(−1)=0 is determined to initialize the PR (1, 0, −1) encoders 121A-121D, and that the time t is updated at every cycle T (=unit time 1) of the clock pulse CK (FIG. 14A and is expressed as t=2m or t=2m+1, equations (2) and (3) yield:

$$ys(t = 2m) = ys(2m-2) + (x(2m) + rs(2m)) = \sum_{i=0}^{m} x(2i) + \sum_{i=0}^{m} rs(2i) \pmod{2} \qquad (4)$$

$$ys(t = 2m-1) = \sum_{i=0}^{m} x(2i-1) + \sum_{i=0}^{m} rs(2i-1) \pmod{2} \qquad (5)$$

The DSV measuring circuits 131A-131D measure the digital sum values during the measuring period K from time $t=T_K+\alpha$ to $t=T_{K+1}-1$. In such case, the following equation (6) is established.

$$\alpha min \leq \alpha \leq \alpha max - 2 \qquad (6)$$

in which αmin is determined by the time required to compare the digital sum values and to determine the minimum value, and αmax corresponds to the bit length of the synchronizing pulses SYNC0 and SYNC1. The portions of the synchronizing block constituted by the synchronizing pulses SYNC0 and SYNC1 are not scrambled so that the digital sum value in the period of $T_K \leq t \leq T_K + \alpha$ is not measured. The digital sum value, which is not measured, is too small to reduce the effects that the present invention achieves.

The DSV measuring circuits 131A-131D measure the digital sum values, $DSV_1$-$DSV_4$ of the respective series at time $t=T_{K+1}$. The determining circuit 132 in the control circuit 129 compares the digital sum values $DSV_1$-$DSV_4$ during the time period of 3 clocks, and supplies to the switch control circuit 133 the series number s0 (1-4) of the series signals y1(t)-y4(t) corresponding to the digital sum value which is closest to zero. The switch control circuit 133 responds to the series number s0 to provide the signal J5 which controls the operation of the switch 126 as shown in FIG. 14D and to provide the signal J6 which controls the operation of the switch 128 as shown in FIG. 14E. The switch circuit 128 selectively passes the signal ys (t-H) (s=s0) of the selected series number s0 only during the period of $T_{K+1}+\alpha min +3 \leq t \leq T_{K+2}+\alpha min +3$. Hence, the following equation is established:

$$y(t) = ys(t-H) \qquad (7)$$

and the signal supplied to the recording head 46A as the recording signal y(t) is ys ($T_K+\alpha min+3$) to ys($T_{K+1}+\alpha min+2$).

This means that the switch circuit 128 selectively provides, during the measuring period K, the signal of the series selected during the preceding measuring period K−1 at a timing delayed by 1H, or by the transmission time of one synchronizing block.

The switch circuit 126 is used to cause the PR (1, 0, −1) encoders 121A-121D to feed-back their output signals Y1(t)-y4(t). The switch 126 supplies the output signal ys0(t), selected as the recording signal during the period of $T_K+\alpha min+3 \leq t < T_{K+1}+\alpha min+3$, to the respective second input terminals of the switch circuits 123 of the PR (1, 0, −1) encoders 121A-121D during the period of two clocks, that is, during the time period $T_{K+1}+\alpha min+1 \leq t < T_{K+1}+\alpha min+3$ in which the PR (1, 0, −1) encoders 121A-121D are initialized. In the time period in which the PR (1, 0, −1) encoders 121A-121D are initialized, each switch circuit 123 selectively supplies to the delay circuit 124 the signal ys0(t) supplied to the switch circuit 123 from the switch circuit 126, whereby the switch circuit 126 and the switch circuits 123 in the plurality of PR (1, 0, −1) encoders 121A to 121D are operated in association with one another. More specifically, within the precoder initialization period, $T_{K+1}+\alpha min+1 \leq t < T_{K+1}+\alpha min+3$, the output signal ys0(t), which is selected as the recording signal during the period of $T_K+\alpha min+3 \leq t < T_{K+1}+\alpha min+3$, is fed back to the input terminals of the PR (1, 0, −1) encoders 121A-121D instead of the output signals y1(t)-y4(t).

Generally, the delay circuits 124 and 125 in the PR (1, 0, −1) encoders 121A-121D delay the output signals by 2 bits and feed the delayed output signals back to the input terminals thereof. Accordingly, in the absence of the described operation of the switch circuit 126, the output signal y2(t), instead of the recording signal y1(t) in the preceding period, would be fed back to the input terminal of the PR (1, 0, −1) encoder 121B when the recording signal, for example, is switched from the output signal y1(t) of the PR (1, 0 −1) encoder 121A to the output signal y2(t) of the PR (1, 0, −1) encoder 121B, with the result that the succeeding recording signal is made different from the original one. However, the switch circuit 126 is provided to enable the PR (1, 0, 01) encoders to be initialized during a predetermined period of time so that even when the recording signal is switched, accurate signals are invariably fed back to the input terminals of the PR (1, 0, −1) encoders 121A-121D.

By reason of the switch circuit 126 and the plurality of switch circuits 123, the output signals ys(t) of the PR (1, 0, −1) encoders 121A-121D are precisely expressed as:

$$ys(t) = ys(t-2) + us(t) \pmod{2} \tag{8}$$

where $t \neq T_K + \alpha min + 3$ and $t \neq T_K + \alpha min + 4$, and are also expressed as $$ys(t) = ys0(t-2) - us(t) \pmod{2} \tag{9}$$

where $t < T_K + \alpha min + 3$ and $t < T_K + \alpha min + 4$, and ys0(t) represents the signal selected as the recording signal in the time period of $t < T_K + \alpha min + 3$. If it is assumed in equations (8) and (9) that ys(−2) = ys(−1) = 0, then equations (4) and (5) yield $$ys(t = 2m) = \sum_{i=0}^{m} x(2i) + \sum_{i=0}^{m} sx(2i) \pmod{2}; s = 1 \sim 4 \tag{10}$$

$$ys(t = 2m + 1) = \sum_{i=0}^{m} x(2i+1) + \sum_{i=0}^{m} rsx(2i+1) \pmod{2}$$

In equation (11), rsx(2i+1) represents, if the present time t lies in a range of $T_K + \alpha min \leq t < T_{K+1} + \alpha min$, a pseudo-random signal rs0(t) (s0 = 1 ~4) of the series selected during the period of $(2i+1) \leq T_K + \alpha min$. In the time period of $T_K + \alpha min < (2i+1)$, rsx (2i+1) represents pseudo-random signals r1(t)-r4(t) corresponding to the PR (1, 0, −1) encoders 121A-121D, which fact is expressed by the following equations.

$$rsx(t) = rs0(t); t \leq T_K + \alpha min \tag{12}$$

$$rsx(t) = rs(t); t > T_K + \alpha min \tag{13}$$

The PR (1, 0, −1) encoders 121A-121D generate the output signals that had once contained the pseudo-random signals selected at every synchronizing block. The signal y(t), selectively produced from the switch circuit 128 at time t, is a signal that is delayed by 1H (one horizontal period) after being scrambled by the selected pseudo-random pattern. The signal y(t) is expressed by the following equations $$y(t) = ys0(t - H) \tag{14}$$
$$= \sum_{i=0}^{m} x(2i - H) + \sum_{i=0}^{m} rs0(2i - H) \pmod{2};$$
$$t = 2m$$

$$y(t) = ys0(t - H) \tag{15}$$
$$= \sum_{i=0}^{m} x(2i - H + 1) + \sum_{i=0}^{m} rs0(2i - H + 1) \pmod{2};$$
$$t = 2m + 1$$

The arrangement of the reproducing side of the digital video tape recorder of FIG. 9, and particularly of the descramble circuit 94 included therein, will now be described with reference to FIG. 11 in which parts corresponding to those described with reference to FIG. 9 are identified by the same reference numerals and are not again described in detail.

Figure 11:
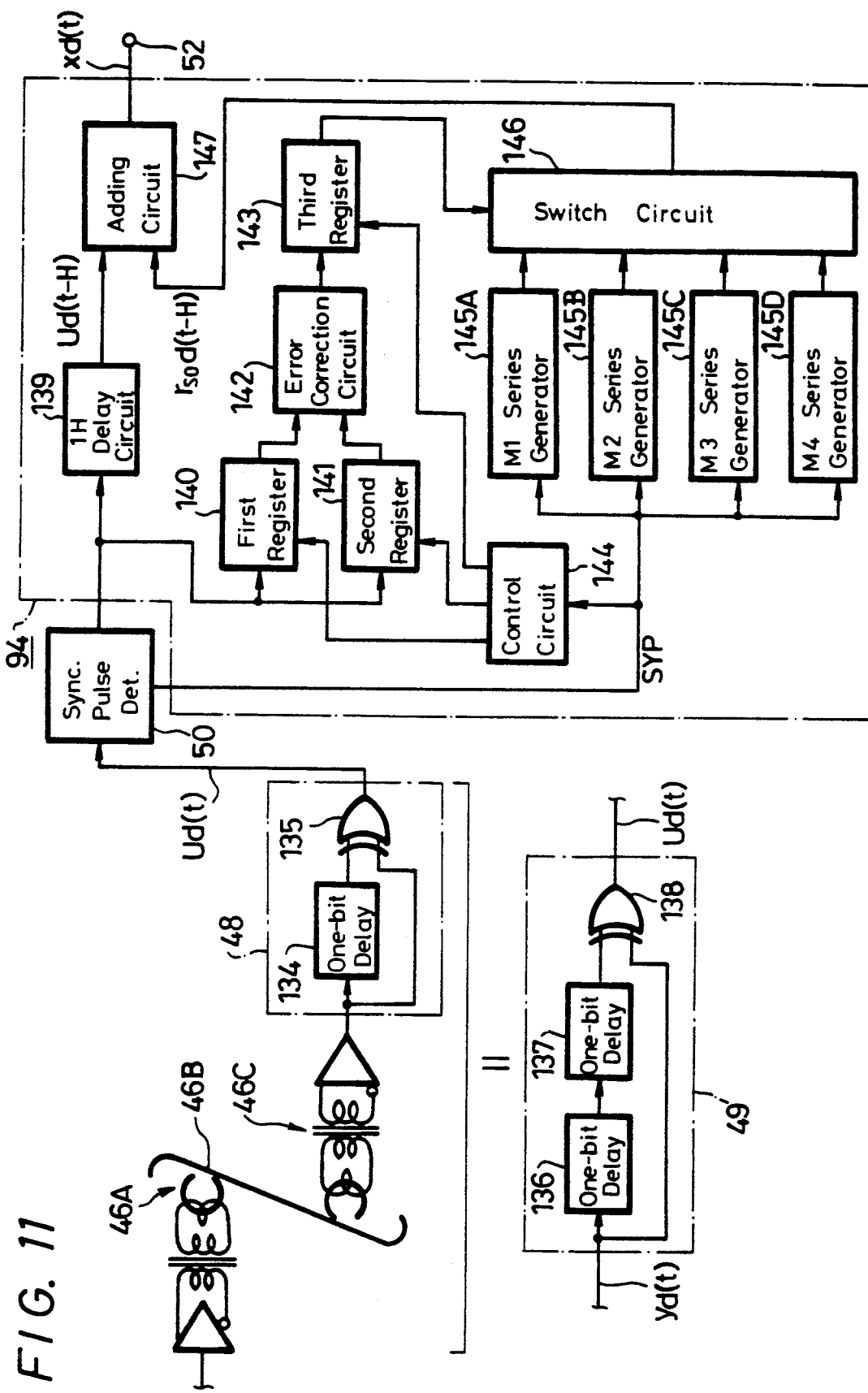
FIG. 11 is a block diagram of a selective descramble circuit included in the digital video tape recorder shown in FIG. 9.

In FIG. 11, it will be seen that the PR (1, 1) decoder 48 is comprised of a one-bit delay circuit 134 and an exclusive-OR gate 135 forming a mod. 2 adder. The PR (1, 1) decoder 48, in association with the recording head 46A, the magnetic tape 46B and the playback head 46C constitutes the PR (1, 0, −1) transmission line 49 which is equivalent to the illustrated circuit comprised of two one-bit delay circuits 136, 137 and an exclusive-OR gate 138, namely, a mod. 2 adder. The PR (1, 0, −1) transmission line 49 effects the conversion just opposite to the conversion of the channel coding performed by the PR (1, 0, −1) encoders 121A-121D in the example shown in FIG. 10, thereby generating the identifying signal Ud(t). The identifying signal Ud(t) corresponds to the signals U1(t) to U4(t) shown in FIG. 10.

The synchronizing-signal-recorded-portions SYNC0, SYNC1 and the M series identifying code-recorded-portions MSID1, MSID2 in the identifying signal Ud(t) are not scrambled by the use of pseudo-random signal, as shown in FIG. 12. Hence, the identifying signal Ud(t) is supplied to the synchronizing pulse detecting circuit 50, in which the synchronizing pulse SYP of a predetermined pattern can be reliably separated from the identifying signal UD(t). The selective descramble circuit 94 receives the synchronizing pulse SYP and the identifying signal Ud(t) derived from the synchronizing pulse detecting circuit 50.

In the selective descramble circuit 94, the identifying signal Ud(t) is supplied to a 1H delay circuit 139 and to first and second registers 140 and 141. The M series identifying code MSID1 shown in FIG. 12 is supplied to the first register 140, whereas the M series identifying code MSID2 is supplied to the second register 141, These M series identifying codes MSID1 and MSID2 fed to the first and second registers 140 and 141 are fed therefrom to an error correction circuit 142. The error correction circuit 142 judges every byte of the identifying codes MSID1 and MSID2 in a majority-logic-fashion and supplies at least one byte of the judged result to a third register 143 as a correct identifying code ([00] to [11]).

A control circuit 144 is initialized by the synchronizing pulse SYP from the detecting circuit 50 and then drives the first, second and third registers 140, 141 and 143 in a predetermined timed relationship.

M series generating circuits 145A-145D are arranged in the same way as the M series generating circuits 116A-116D of FIG. 10. The M series generating circuits 145A-145D are initialized by the synchronizing pulse SYP to generate pseudo-random signals of M1-M4 series, which are fed to respective input terminals of a four-input switch circuit 146. The switch circuit 146 responds to an identifying code from the third register 143 to selectively produce one of the pseudo-random signals of the M1-M4 series. This selected pseudo-random signal rs0d(t-H) is supplied to one input terminal of a mod. 2 adding circuit 147 (formed of, for example, an exclusive-OR gate). The output signal Ud(t-H) from the 1H delay circuit 139 is supplied to the other input terminal of the adding circuit 147, and the output signal xd(t) from the adding circuit 147 is fed to the output terminal 52.

The embodiment shown in FIG. 11 operates as follows:

The third register 143 stores the M series identifying code of the block K corresponding to the time period $T_K \leq t < T_{K+1}$ of the identifying signal Ud(t) during the time period of $T_{K+1} \leq t < T_{K+2}$, and supplies the thus stored M series identifying code to the switch circuit 146. The switch circuit 146 supplies the signal rs0d(t-H) corresponding to the M series identifying code to the adding circuit 147 during the time period of $T_{K+1} \leq t < T_{K+2}$. In the signals Ud(t), rs0d(t-H) and xd(t), the legend [d] indicates in each case the possibility that the respective variable will contain an error.

In order to examine the influence exerted by the occurrence of error in the PR (1, 0 −1) transmission line 49, let it be assumed that the input signal yd(t) applied to the recording head 46A, that is, the input to the PR (1, 0, −1) transmission line 49, corresponds to that obtained when an error signal e(t) is added to the recording signal y(t) shown in FIG. 10. In other words, $$yd(t) = y(t) + 3(t) \qquad (16)$$

and, if t=2m, from equation (10), the identifying signal Ud(t)

$$rsx(t) = rs0(t); \ t \leq T_K + \alpha min \qquad (16)$$

which is the output signal from the PR (1, 0 −1) transmission line 49 is expressed by the following equation:

$$\begin{aligned} Ud(t2m) &= Ud(2m) - yd(2m - 2) \ (\text{mod. } 2) \qquad (17)\\ &= (y(2m) + e(2m)) - (y(2m - 2) + e(2m - 2))\\ &= \sum_{i=0}^{m} (x(2i) + rs0(2i)) + e(2m)\\ &= -\sum_{i=0}^{m-1} (x(2i) + rs0(2i)) + e(2m - 2)\\ &= x(2m) + rs0(2m) + e(2m) + 2(2m - 2) \end{aligned}$$

From a mathematical standpoint, a feature that the addition of mod. 2 is equivalent to the subtraction is utilized to derive the equation (17). Similarly, from equation (11), if t=2m+1, t he identifying signal Ud(t) is expressed by the following equation:

$$Ud(t = 2m + 1) = x(2m + 1) + rs0(2m + 1) + \qquad (18)$$

$$e(2m + 1) + 3(2m + 3) \ (\text{mod. } 2)$$

Combining equations (17) and (18) yields $$Ud(t) = x(t) + rs0(t) + e(t) + e(t - 2) \qquad (19)$$

Further, the output signal xd(t) of the adding circuit 147 can be calculated by the following equation:

$$\begin{aligned} xd(t) &= Ud(t - H) + rs0(t - H) \ (\text{mod. } 2) \qquad (20)\\ &= x(t - H) + rs0(t - H) + e(t - H) - (t - H - 2) + \\ &\quad rs0d(t - H) \end{aligned}$$

Since the equality, rs0d(t-H) =rs0(t-H) is established when the correct M series signal is selected by the switch circuit 146, equation (20) can be modified to read:

$$xd(t) = x(t\text{-}H) + e(t\text{-}H) + e(t\text{-}H\text{-}2) \qquad (21)$$

Thus, the output signal xd(t) from the adding circuit 147 becomes equal to the output signal from the PR (1, 0 −1) transmission line. The fact that the addition of a number to the same number results in zero in the addition of mod. 2 is utilized to derive the equation (21) from equation (20). If e(t-H) =e(t-H-2) =0 is established in equation (21), this yields:

$$xd(t) = x(t\text{-}H) \qquad (22)$$

Thus, it is to be understood that the input to the circuit shown in FIG. 10, that is, the signal x(t), delayed by 1H, is equal to the signal xd(t) which is the output from the circuit shown in FIG. 11. When the selective descramble circuit 94 is used as described above, the pseudo-random signal of the same series as the scrambled M series signal is added in mod. 2 to the identifying signal ud(t) so that the scrambled M series signal is removed from the identifying signal ud(t), thus making it possible to correctly decode the input signal x(t).

Although in the above-described embodiment shown in FIG. 10 the control circuit 129 in the selective scramble circuit 93 measures the digital sum values of the respective output signals y1(t)-y4(t) of the PR (1, 0 − 1) encoders 121A-121D, the control circuit 129 may measure, instead of the digital sum values, the maximum run lengths $RUN_1$-$RUN_4$, that is, the maximum contiguous number of high level [1] bits or low level [0] bits, in the respective output signals y1(t)-y4(t) within predetermined time periods, and then generate, as the recording signal, the output signal ys(t) which has the shortest of these maximum run lengths $RUN_1$-$RUN_4$.

While the PR (1, 0, −1) encoders 121A-121D are employed as the precoders in the above described embodiment the present invention can be similarly applied to a channel coding circuit which, for example, utilizes PR (1, −1) encoders as the precoders.

Furthermore, the addition of the M series identifying code and of the synchronizing pulse may be effected, for example, between the switch circuit 128 and the recording head 46A, rather than at the multiplexers 119A-119D between the mod. 2 adders 117A-117D and the PR (1, 0, −1) encoders 121A-121D. In that case, although the M series identifying code and the synchronizing pulse are not processed by the channel coding process, no problem is presented if a pattern is selected having reduced high frequency and direct current components.

Since, in accordance with the present invention, the precoders are used to reduce both the maximum frequency of the recording signal and the direct current component, and the pseudo-random signal, which scrambles the input signal, is selected so as to provide the best direct current component of the recording signal which is output from the precoders and to provide the best run length, regardless of the change of the pattern of the input signal, it is possible to substantially suppress and thereby minimize the direct current component of the recording signal.

Further, in accordance with the present invention, when the signal constituting the recording signal is switched from the output of a first PR (1, 0 −1) encoder to the output of a second PR (1, 0, −1) encoder, the output signal of the first PR (1, 0, −1) encoder, that is, the present recording signal, can be fed back to the input terminal of the second PR (1, 0, −1) encoder by means of the switch circuit 126 so that the recording signal can be positively fed back to the input terminals of the respective PR (1, 0 −1) encoders. Hence, mixing of conversion error into the generated recording signal can be prevented.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for processing an input data signal comprising:
   generator means for generating a plurality of pseudo-random signals;
   scramble means coupled to said generator means for scrambling the input data signal by each of said plurality of pseudo-random signals and thereby providing a plurality of respective outputs;
   detector means for detecting variation of a DC component for each of said outputs of said scramble means;
   selector means controlled by said detector means for selecting one of said outputs of said scramble means exhibiting a desired DC component;
   means for adding to said one output selected by said selector means an identifying signal which identifies the pseudo-random signal used in scrambling said one selected output of the scramble means; and
   means for transmitting a signal comprised of said one output selected by said selector means together with said identifying signal.

2. An apparatus according to claim 1; wherein said means for transmitting includes means for recording said one output selected by said selector means with said identifying signal on a magnetic tape.

3. An apparatus according to claim 2; wherein said detector means detects maximum run-lengths of said outputs of said scramble means, and said selector means selects the one of said outputs of the scramble means having the shortest of said maximum run lengths.

4. An apparatus according to claim 2; wherein said detector means detects maximum digital sum values of said outputs of the scramble means, and said selector means selects the one of said outputs of the scramble means having the smallest of said maximum digital sum values.

5. An apparatus according to claim 1; further comprising precoder means for encoding each of said outputs of said scramble means to have a predetermined frequency characteristic.

6. An apparatus according to claim 5; wherein said precoder means is a partial response encoder means.

7. An apparatus for processing an input data single comprising:
   generator means for generating a plurality of pseudo-random signals;
   scramble means coupled to said generator means for scrambling the input data signal by each of said plurality of pseudo-random signals and thereby providing a plurality of respective outputs;
   first detector means for detecting variation of a DC component for each of said outputs of said scramble means;
   selector means controlled by said first detector means for selecting one of said outputs of said scramble means exhibiting a desired DC component;
   means for adding to said one output selected by said selector means an identifying signal which identifies the pseudo-random signal used in scrambling said one selected output of the scramble means;
   means for transmitting a signal comprised of said one output selected by said selector means together with said identifying signal;
   receiver means for receiving a signal transmitted by said means for transmitting;
   second detector means for detecting said identifying signal in the received, transmitted signal;
   local pseudo-random signal generating means for generating local pseudo-random signals; and
   de-scramble means for de-scrambling the received signal in accordance with one of said local pseudo-random signals corresponding to the detected identifying signal.

8. An apparatus for processing an input data signal comprising:
   generator means for generating a plurality of pseudo-random signals;
   scramble means for scrambling the input data signal by each of said plurality of pseudo-random signals and thereby providing a plurality of respective outputs;
   precoder means for encoding each of said outputs of said scramble means to have a predetermined frequency characteristic, including a plurality of partial response encoders each comprising feedback circuit means having a delay for encoding a respective output of said scramble means in accordance with a partial response method, and switching means for providing, as a feedback to one of said partial response encoders, an output signal of another of said partial response encoders;
   detector means for detecting variation of a DC component for each of said outputs of said scramble means;
   selector means controlled by said detector means for selecting one of said outputs of said scramble means exhibiting a desired DC component;
   means for adding to said one output selected by said selector means an identifying signal which identifies the pseudo-random signal used in scrambling said one selected output of the scramble means; and
   means for transmitting a signal comprised of said one output selected by said selector means together with said identifying signal.

* * * * *